(12) United States Patent
Oury et al.

(10) Patent No.: US 8,460,815 B2
(45) Date of Patent: Jun. 11, 2013

(54) STACKABLE REPEATING FRAME WITH INTEGRATED CELL SENSING CONNECTION

(75) Inventors: Andrew P. Oury, Troy, MI (US); Kathleen M. Campbell, Troy, MI (US); Andres V. Mituta, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 344 days.

(21) Appl. No.: 12/789,938

(22) Filed: May 28, 2010

(65) Prior Publication Data

US 2011/0293983 A1  Dec. 1, 2011

(51) Int. Cl.
*H01M 10/50* (2006.01)
*H01M 2/24* (2006.01)

(52) U.S. Cl.
USPC .................... 429/120; 429/158; 429/160

(58) Field of Classification Search
USPC .................................. 429/120–347
See application file for complete search history.

(56) References Cited

U.S. PATENT DOCUMENTS

| 5,204,194 A * | 4/1993 | Miller et al. ............. 429/7 |
| 7,819,700 B2 * | 10/2010 | Kruger et al. ............. 439/627 |
| 2007/0059593 A1 * | 3/2007 | Kim et al. ............. 429/162 |

* cited by examiner

*Primary Examiner* — Basia Ridley
*Assistant Examiner* — James Lee
(74) *Attorney, Agent, or Firm* — Fraser Clemens Martin & Miller LLC; J. Douglas Miller

(57) ABSTRACT

A module for a battery pack includes a cooling frame and a spacer frame. At least one of the first and second surfaces of the cooling frame is adapted to transfer heat to a coolant flow. A first battery cell having first and second electrically conductive tabs abuts a cooling frame member first surface. A second end of the cooling frame member includes a connection terminal for electrically connecting to the first electrically conductive tab. A spacer frame member first surface abuts the first battery cell, and a second surface abuts a second battery cell. A first end of the spacer frame member includes a connection terminal for electrically connecting to the second electrically conductive tab of the first battery cell and the first electrically conductive tab of the second battery cell.

11 Claims, 7 Drawing Sheets

STACKABLE REPEATING FRAME WITH INTEGRATED CELL SENSING CONNECTION

FIELD OF THE INVENTION

The present disclosure relates to a battery pack and more particularly to a battery pack assembly for housing battery cells.

BACKGROUND OF THE INVENTION

A battery cell has been proposed as a clean, efficient and environmentally responsible power source for an electric device such as an electric vehicle, for example. Typically, a plurality of individual battery cells is provided to supply an amount of electric power sufficient to operate the electric device. The plurality of individual battery cells must be physically supported and protected as well as be in electrical communication with each other and the electrical device. Further, it is often desired to provide cooling to the battery cells during a charging and a discharging thereof and venting of the battery cells.

A battery pack assembly is typically provided to support and protect the plurality of battery cells and facilitate placing individual battery cells in electrical communication with each other and with the associated electrical device. Additionally, the battery pack assembly often provides a cooling system to militate against undesirable overheating of the battery cells and a venting system. To provide such desired electrical communication, cooling, and venting, a complexity and cost of the battery pack assembly for use in a hybrid automobile is undesirably increased.

Additionally, it is desirable to mechanically and electrically connect adjacent individual battery cells with each other with a low electrical resistance connection, on the order of 30 micro-Ohms. It is also desirable to provide a voltage sense lead from each terminal of the individual battery so that electrical hardware can measure and adjust (via cell balancing) the voltage of each cell. Further, it is desirable that each battery cell inside the battery pack be provided with an isolated chamber or space that can capture and vent to a predetermined vent area any gases, liquids, or solids that the cell might expel should the cell experience a thermal runaway. Still further, it is desirable to provide coolant flow paths or channels within the battery pack assembly through which gaseous or liquid coolant may flow to cool the battery cells, wherein the coolant flow paths are isolated from the isolated chamber, space or predetermined vent area. Lastly, it is desirable to provide all of the aforementioned features in a battery pack assembly that is easy to manufacture at a low cost.

SUMMARY OF THE INVENTION

Concordant and consistent with the present invention, a repeating frame battery pack assembly for housing a plurality of battery cells providing electrical connections between adjacent battery cells and between the battery pack assembly and an associated electrical device and cooling and venting of the plurality of battery cells, wherein an ease of manufacturing the battery pack assembly is maximized and a cost thereof is minimized has surprisingly been discovered.

An intermediate module for a battery pack assembly having a plurality of battery cells includes a cooling frame member having first and second substantially planar surfaces and first and second ends, at least one of the first surface and the second surface adapted to transfer heat to a coolant flow. A first battery cell abuts the first surface and has first and second electrically conductive tabs respectively adjacent to the cooling frame member first and second ends. The second end of the cooling frame member includes a connection terminal for electrically connecting to the first electrically conductive tab, while the first end of the cooling frame member includes a support plate integrally formed therewith for supporting the second electrically conductive tab. The intermediate module further includes a spacer frame member having a first surface and a second surface and first and second ends, the spacer frame member second surface abutting the first battery cell. A second battery cell abuts the spacer frame member first surface. The first end of the spacer frame member includes a connection terminal for electrically connecting to the second electrically conductive tab of the first battery cell and the first electrically conductive tab of the second battery cell.

In one embodiment, one or more of the intermediate frame members is combined with an end frame member and an end module member to form a battery pack assembly.

In another embodiment, the connection terminals further include a voltage sensing lead in electrical communication therewith. A current limiting device may be interposed between each voltage sensing lead and the connection terminals.

In still another embodiment, the first electrically conductive tabs of each battery cells extend outwardly from a perimeter of the battery cell substantially parallel to a plane defined by the end frame member first surface. The second electrically conductive tab of each battery cell extends outwardly from the battery cell perimeter at an angle of between 45 and 135 degrees with reference to the plane defined by the end frame member first surface to facilitate connection to the connection terminal of an adjacent member.

BRIEF DESCRIPTION OF THE DRAWINGS

The above, as well as other advantages of the present invention will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1A:
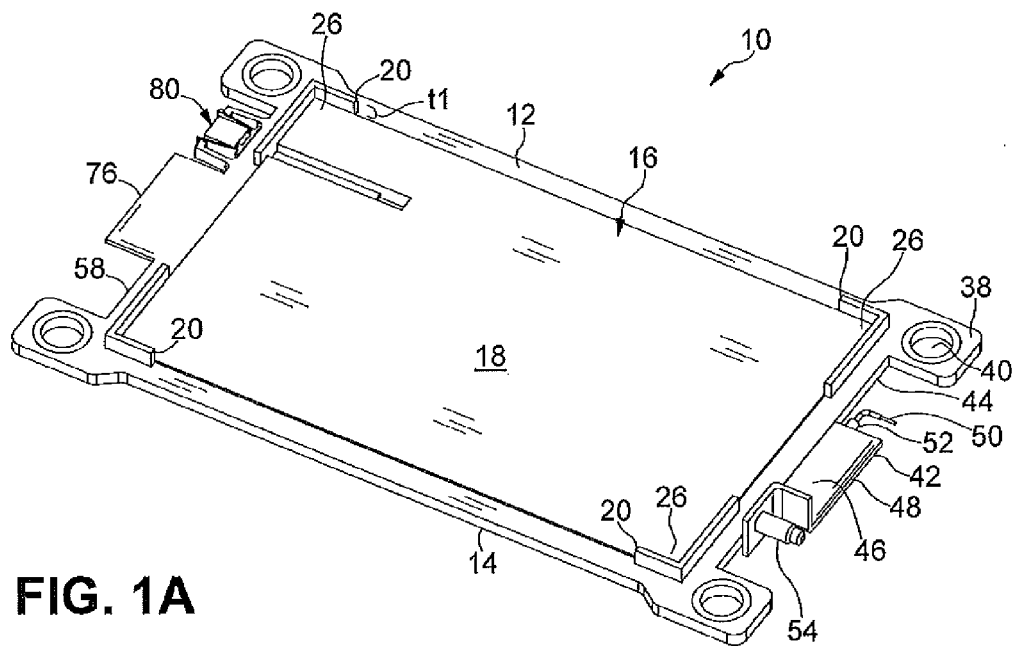
FIG. 1A is a perspective view of an end frame member according to the present disclosure.
Figure 1B:
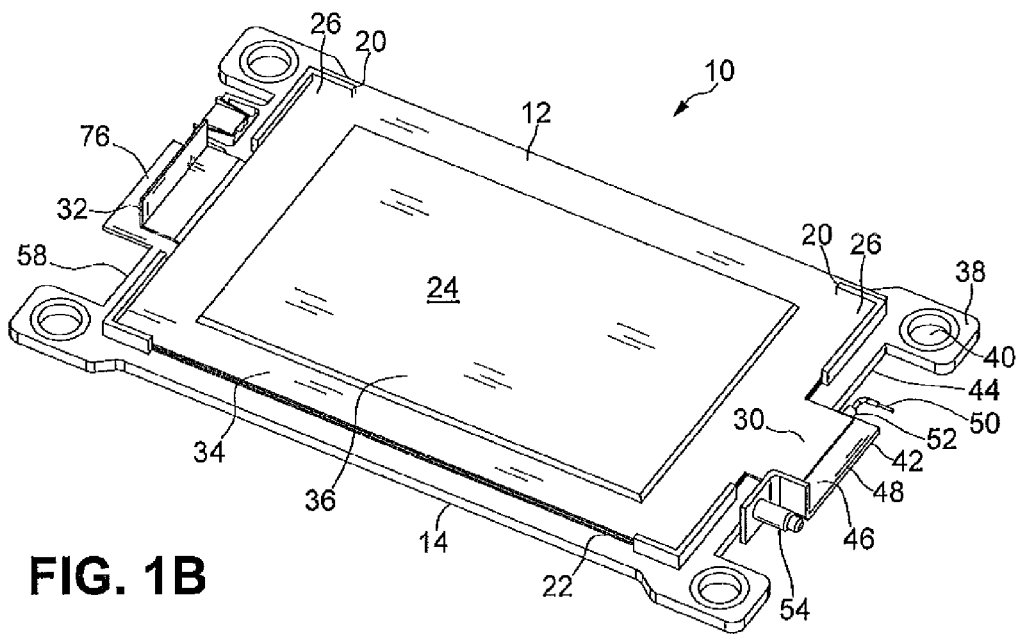
FIG. 1B is an elevational perspective view of the end frame member of FIG. 1A and a first battery cell.

An end frame member 10 is shown in FIGS. 1A and 1B. While the end frame member 10 is represented as having a substantially rectangular shape, it is understood that the end frame member 10 may have any shape as desired to accommodate a shape of a battery cell and a fitment with an associated electrical device. The end frame member 10 is formed as a unitary member by known methods from an electrically non-conductive material. As a non-limiting example, the end frame member 10 may be formed by injection molding a material such as a nylon, polypropylene, metal, or other material having suitable physical and chemical properties.

The end frame member 10 includes an interior side 12 and an exterior side 14. The exterior side 14 may include any desired surface features, or may be formed as a substantially planar outer surface. The interior side 12 includes a cavity 16 defined by an interior surface 18 and a plurality of perimeter walls 20. As shown, the perimeter walls 20 are located proximate the corners 26 that define the cavity 16, and are designed to engage an outer perimeter 22 of a battery cell 24 to locate the battery cell 24 in mating contact with the interior surface 18. It is understood that the perimeter walls may be formed about all or only a portion of the perimeter of the cavity 16 as desired. The perimeter walls 20 also provide separation between the end frame member 10 and an adjacent member (not shown).

In the illustrated embodiment, the battery cell 24 is a prismatic lithium-ion battery cell having a first electrically conductive tab 30 and a second electrically conductive tab 32 extending outwardly from the perimeter 22 of the battery cell 24. It is understood that other battery cells, employing a different structure and electrochemistry, may also be used. It is also understood that the first and second electrically conductive tabs 30, 32 may extend outwardly from the battery cell 24 in any desired location along the perimeter 22 of the battery cell 24, and may be formed of any electrically conductive material and in any desired shape to facilitate establishing electrical communication with other battery cells 24 and with the end frame member 10. In one embodiment, the first electrically conductive tab 30 is formed of an aluminum material, an aluminum clad material, or an aluminum plated material, and extends or is bent substantially parallel to a plane defined by the interior surface 18 of the end frame member 10. In another embodiment, the second electrically conductive tab 32 is formed of a copper material, a copper clad material, or a copper plated material, and extends or is bent substantially at an acute angle with reference to the plane defined by the interior surface 18 of the end frame member 10. In the embodiment shown in FIG. 1B, a perimeter portion 34 of the battery cell 24 has a thickness less than the thickness t1 of the perimeter walls 20, while an interior portion 36 of the battery cell 24 has a thickness equal to or slightly greater than the thickness t1 of the perimeter walls 20 to facilitate compression of the battery cell 24 when assembled into a battery pack assembly. The perimeter portion 34 of the battery cell 24 cooperates with the cavity 16 and the perimeter walls 20 to form an isolated chamber or space to capture and vent to a predetermined vent area (not shown) any gases, liquids, or solids that the battery cell 24 might expel should the battery cell 24 experience a leak or a thermal runaway condition.

Ears 38 are formed in the end frame member 10 adjacent each corner 26 of the cavity 16. An aperture 40 is formed in each of the tabs 34 to receive a tension rod (not shown) to interconnect the end frame member 10 with adjacent members to form a battery pack assembly and to hold the components of the battery pack assembly in compression. The end frame member 10 is also formed with a connection terminal 42 attached to a first end 44 of the end frame member 10. The connection terminal 42 is adapted to form a low resistance electrical connection with the first tab 30 of the battery cell 24. Favorable results have been obtained where the connection terminal 42 is a j-bar connection having a first leg 46 extending outwardly from the first end 44 substantially parallel to the plane defined by the interior surface 18 of the end frame member 10 and, if necessary, a second leg 48 in electrical communication with the first leg 46 extending at an angle of between about 45 degrees and 135 degrees from the first leg 46. The first tab 30 of the battery cell 24 and the first leg 46 of the connection terminal 42 are formed of similar material (i.e. aluminum or aluminum clad material) to facilitate a low electrical resistance connection therebetween, on the order of about 30 micro-Ohms. Favorable results have been obtained where the first tab 30 of the battery cell 24 and the first leg 46 of the connection terminal 42 are resistance welded, laser welded, soldered or brazed together to obtain the low electrical resistance connection therebetween. Once the first tab 30 of the battery cell 24 and the first leg 46 of the connection terminal 42 are electrically connected, the end frame member 10 is ready to be combined with adjacent components, as discussed below with reference to FIG. 5.

A voltage sensing lead 50 extends from the first end 44 of the end frame member 10. The voltage sensing lead 50 shown in FIGS. 1A and 1B is a male pin style lead, but it is understood that the voltage sensing lead 50 may facilitate any type of electrical connection as desired. The voltage sensing lead 50 is in electrical communication with the connection terminal 42, and may be integrally formed therewith. Optionally, a current limiting device 52 such as a fuse or similar device may be electrically interposed between the connection terminal 42 and the voltage sensing lead 50 to protect voltage sensing equipment or circuitry (not shown) from current surges. If desired, a portion of the voltage sensing lead 50, including the current limiting device 52, may be embedded or over molded into the first end 44 of the end frame member 10 to provide protection thereto. The connection terminal 42 may also include an electrical connection 54 adapted to act as an external terminal for a battery pack assembly constructed according to the present disclosure for electrical interconnection with an electrical load or with an adjacent battery pack assembly. A second end 58 of the end frame member includes a support plate 76 integrally formed in the second end 58. The support plate 76 is electrically non-conductive, and is adapted to provide support to the second tab 32 of the battery cell 24 and to align the second tab 32 with a connection terminal on an adjacent member, as will be discussed below with reference to FIG. 5. Finally, the end frame member 10 may optionally include a thermister assembly 80 to facilitate monitoring a temperature of the battery cell 24.

Figure 2A:
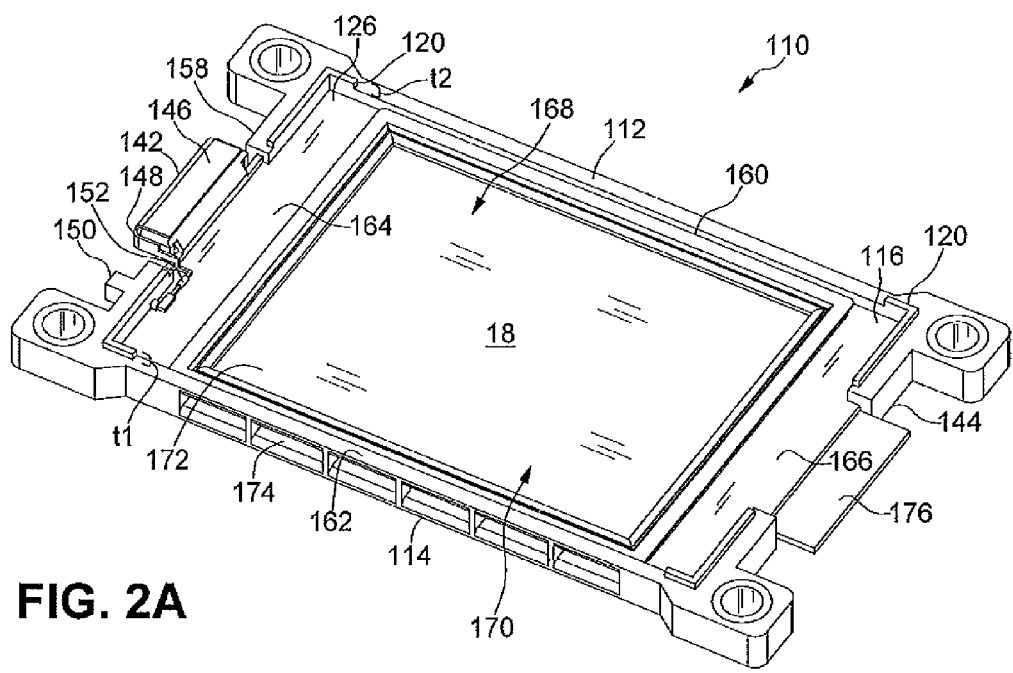
FIG. 2A is a perspective view of a cooling frame member according to the present disclosure.
Figure 2B:
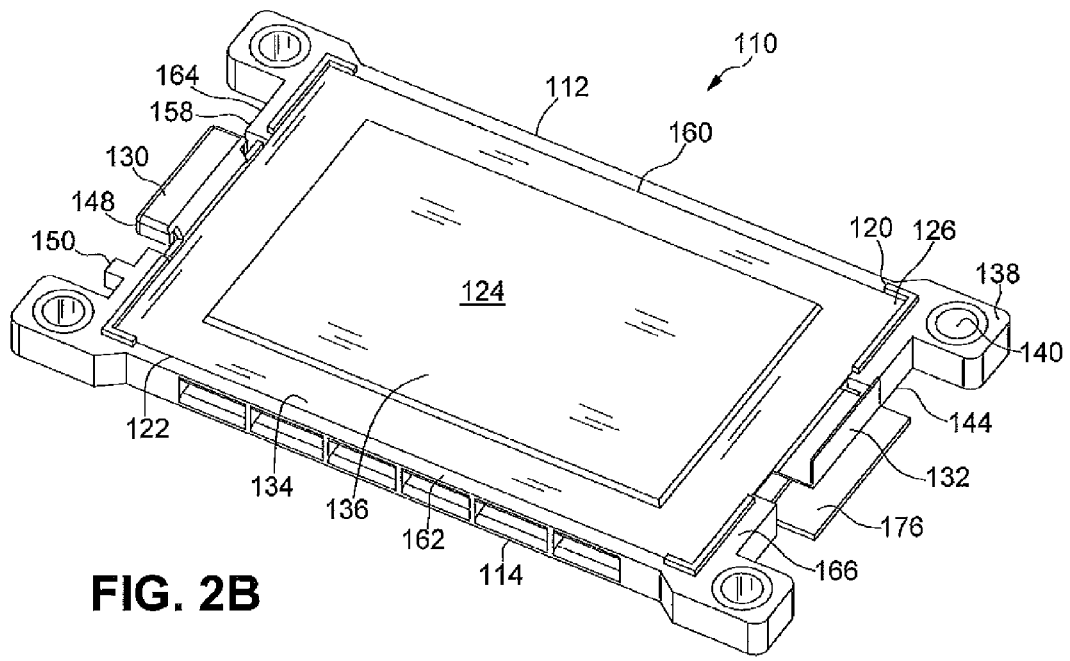
FIG. 2B is a perspective view of the cooling frame member of FIG. 2A and a second battery cell.

A cooling frame member 110 is shown in FIGS. 2A and 2B. While the cooling frame member 110 is represented as having a substantially rectangular shape, it is understood that the cooling frame member 110 may have any shape as desired to accommodate a shape of a battery cell and a fitment with an associated electrical device. It is further understood that the cooling frame member 110 will have substantially the same shape as the end frame member 10 described with reference to FIGS. 1A and 1B. The cooling frame member 110 is formed as a unitary member by known methods from an electrically non-conductive material. As a non-limiting example, the cooling frame member 110 may be formed by injection molding a material such as a nylon, polypropylene, metal, or other material having suitable physical and chemical properties.

The cooling frame member 110 includes a first side 112 and a second side 114, and further includes a first leg 160, a second leg 162, a third leg 164, and a fourth leg 166 forming an opening 168 through the central portion of the cooling frame member 110. A cooling module 170 is received into the opening 168, and may include a thermally conductive plate 172 affixed to the first side 112 and another thermally conductive plate (not shown) affixed to the second side 114 of the cooling frame member to seal the opening 168. The cooling module 170 may be any type known to provide cooling to a battery cell 124, and may include active or passive cooling. For example, the cooling module 170 may be of the type described in commonly owned U.S. patent application Ser. No. 12/789,888, entitled "Corrugated Fin And Frame Assembly For Battery Cooling", incorporated herein by reference in its entirety. A plurality of slots 174 is formed in the first leg 160 and the second leg 162 of the cooling frame member 110 to provide fluid communication through the legs 160, 162 with the cooling module 170.

The first side 112 includes a cavity 116 defined by an interior surface 118 of the thermally conductive plate 172 and a plurality of perimeter walls 120. As shown in the figures, the perimeter walls 120 are located proximate corners 126 that define the cavity 116, and are designed to engage an outer perimeter 122 of a battery cell 124 to locate the battery cell 124 in mating contact with the interior surface 118, where the mating contact is provided to cool the battery cell 124. It is understood that the perimeter walls 120 may be formed about all or only a portion of the perimeter of the cavity 116 as desired. The perimeter walls 120 also provide separation between the cooling frame member 110 and an adjacent member (not shown).

In the illustrated embodiment, the battery cell 124 is a prismatic lithium-ion battery cell having a first electrically conductive tab 130 and a second electrically conductive tab 132 extending outwardly from the perimeter 122 of the battery cell 124. It is understood that the battery cell 124 is substantially similar in construction to the battery cell 24, but any compatible battery cell may be used. It is also understood that the first and second electrically conductive tabs 130, 132 may extend outwardly from the battery cell 124 in any desired location along the perimeter 122 of the battery cell 124, and may be formed of any electrically conductive material and in any desired shape to facilitate establishing electrical communication with other battery cells 124 and with the cooling frame member 110. In one embodiment, the first electrically conductive tab 130 is formed of an aluminum material, an aluminum clad material, or an aluminum plated material, and extends or is bent substantially parallel to a plane defined by the interior surface 118 of the cooling frame member 110. In another embodiment, the second electrically conductive tab 132 is formed of a copper material, a copper clad material, or a copper plated material, and extends or is bent substantially at an acute angle with reference to the plane defined by the interior surface 118 of the cooling frame member 110. In the embodiment shown in FIG. 2B, a perimeter portion 134 of the battery cell 124 has a thickness less than the thickness t2 of the perimeter walls 120, while an interior portion 136 of the battery cell 124 has a thickness equal to or slightly greater than the thickness t2 of the perimeter walls 120 to facilitate compression of the battery cell 124 when assembled into a battery pack assembly. The perimeter portion 134 of the battery cell 124 cooperates with the cavity 116 and the perimeter walls 120 to form an isolated chamber or space to capture and vent to a predetermined vent area (not shown) any gases, liquids, or solids that the battery cell 124 might expel should the battery cell 124 experience a leak or a thermal runaway condition.

Ears 138 are formed in the cooling frame member 110 adjacent each corner 126 of the cavity 116. An aperture 140 is formed in each of the ears 138 to receive a tension rod (not shown) to interconnect the cooling frame member 110 with adjacent members to form a battery pack assembly and to hold the components of the battery pack assembly in compression. The cooling frame member 110 is also formed with a connection terminal 142 attached to a second end 158 of the cooling frame member 110. As shown in FIGS. 2A and 2B, the second end 158 corresponds to the outside of the third leg 164 of the cooling frame member 110. The connection terminal 142 is adapted to form a low resistance electrical connection with the first tab 130 of the battery cell 124. Favorable results have been obtained where the connection terminal 142 is a j-bar connection having a first leg 146 extending outwardly from the second end 158 substantially parallel to the plane defined by the interior surface 118 of the cooling frame member 110 and, if necessary, a second leg 148 in electrical communication with the first leg 146 extending at an angle of between about 45 degrees and 135 degrees from the first leg 146. The first tab 130 of the battery cell 124 and the first leg 146 of the connection terminal 142 are formed of similar material (i.e. aluminum or aluminum clad material) to facilitate a low electrical resistance connection therebetween, on the order of about 30 micro-Ohms. Favorable results have been obtained where the first tab 130 of the battery cell 124 and the first leg 146 of the connection terminal 142 are resistance welded, laser welded, soldered or brazed together to obtain the low electrical resistance connection therebetween. Once the first tab 130 of the battery cell 124 is electrically connected to the first leg 146 of the connection terminal 142, the cooling frame member 110 is ready to be combined with adjacent components, as discussed below with reference to FIG. 5.

A voltage sensing lead 150 extends from the second end 158 of the cooling frame member 110. The voltage sensing lead 150 is shown as a female pin style lead, but it is understood that the voltage sensing lead 150 may facilitate any type of electrical connection as desired. The voltage sensing lead 150 is in electrical communication with the connection terminal 142, and may be integrally formed therewith. Optionally, a current limiting device 152 such as a fuse or similar device may be electrically interposed between the connection terminal 142 and the voltage sensing lead 150 to protect voltage sensing equipment or circuitry (not shown) from current surges. In the embodiment shown in FIG. 2A, a portion of the voltage sensing lead 150, including the current limiting device 152, is embedded or over molded into the second end 158 of the cooling frame member 110 to provide protection thereto.

A first end 144 of the cooling frame member, corresponding to the outside of the fourth leg 166 in FIGS. 2A and 2B, includes a support plate 176 integrally formed in the fourth leg 166. The support plate 176 is electrically non-conductive, and is adapted to provide support to the second tab 132 of the battery cell 124 and to align the second tab 132 with a connection terminal on an adjacent member, as will be discussed below with reference to FIG. 5.

Figure 3A:
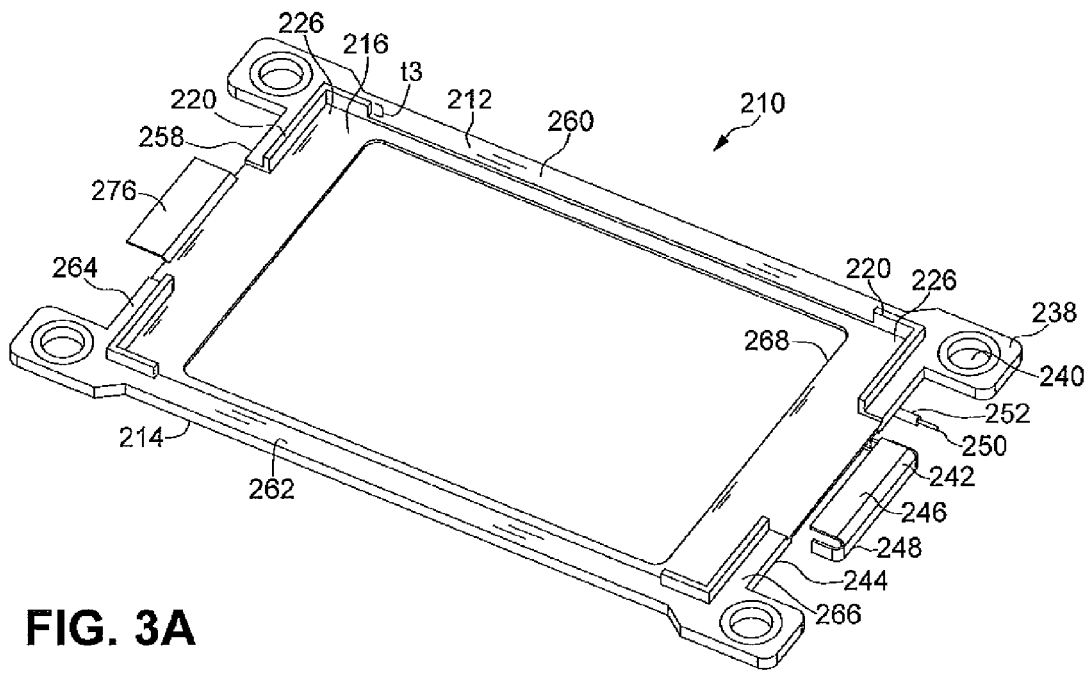
FIG. 3A is a perspective view of a spacer frame member according to the present disclosure.
Figure 3B:
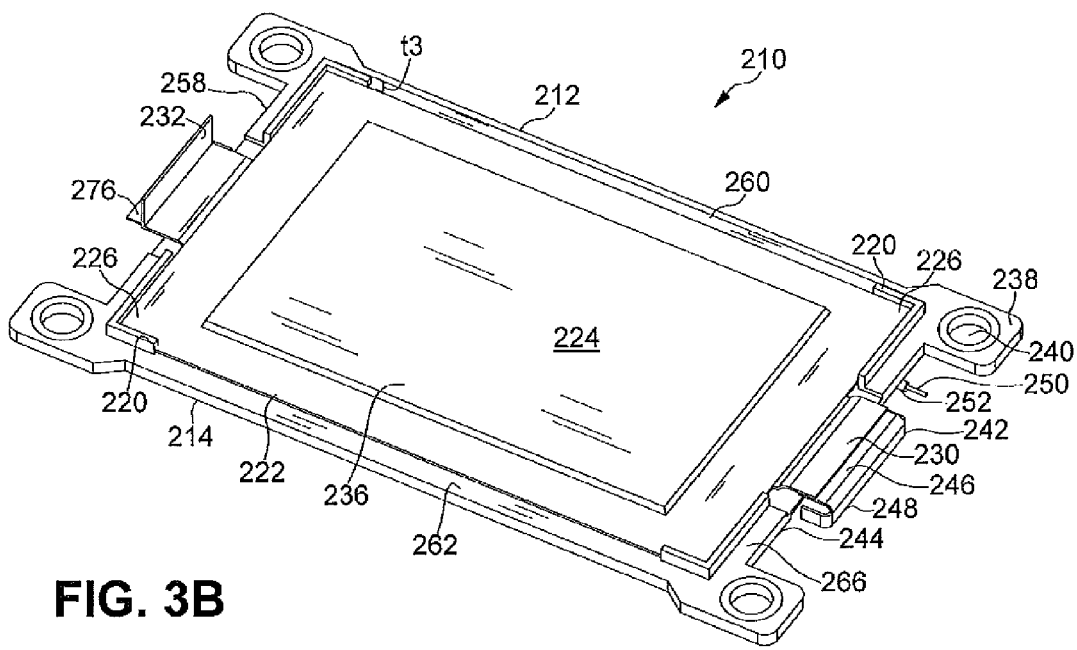
FIG. 3B is a perspective view of the spacer frame member of FIG. 3A and a third battery cell.

A spacer frame member 210 is shown in FIGS. 3A and 3B. While the spacer frame member 210 is represented as having a substantially rectangular shape, it is understood that the spacer frame member 210 may have any shape as desired to accommodate a shape of a battery cell and a fitment with an associated electrical device. It is further understood that the spacer frame member 210 will have substantially the same shape as the end frame member 10 described with reference to FIGS. 1A and 1B and the cooling frame member 110 described with reference to FIGS. 2A and 2B. The spacer frame member 210 is formed as a unitary member by known methods from an electrically non-conductive material. As a non-limiting example, the spacer frame member 210 may be formed by injection molding a material such as a nylon, polypropylene, metal, or other material having suitable physical and chemical properties.

The spacer frame member 210 includes a first side 212 and a second side 214, and further includes a first leg 260, a second leg 262, a third leg 264, and a fourth leg 266 forming an opening 268 through the central portion of the spacer frame member 210. The first side 212 includes a cavity 216 defined by an interior surface 218 and a plurality of perimeter walls 220. As shown in the figures, the perimeter walls 220 are located proximate corners 226 that define the cavity 216, and are designed to engage an outer perimeter 222 of a battery cell 224 to locate an outer perimeter portion 234 of the battery cell 224 in mating contact with the interior surface 218. An interior portion 236 of the battery cell 224 is arranged within the cavity 216 and extends through to the second side 214 of the spacer frame member 210 to facilitate thermal communication with an adjacent battery cell 124 in a cooling frame member 110. It is understood that the perimeter walls may be formed about all or only a portion of the perimeter of the cavity 216 as desired. The perimeter walls 220 also provide separation between the spacer frame member 210 and an adjacent member (not shown).

In the illustrated embodiment, the battery cell 224 is a prismatic lithium-ion battery cell having a first electrically conductive tab 230 and a second electrically conductive tab 232 extending outwardly from the perimeter 222 of the battery cell 224. It is understood that the battery cell 224 is substantially similar in construction to the battery cells 24, 124, but any compatible battery cell may be used. It is also understood that the first and second electrically conductive tabs 230, 232 may extend outwardly from the battery cell 224 in any desired location along the perimeter 222 of the battery cell 224, and may be formed of any electrically conductive material and in any desired shape to facilitate establishing electrical communication with other battery cells 224 and with the spacer frame member 210. In one embodiment, the first electrically conductive tab 230 is formed of an aluminum material, an aluminum clad material, or an aluminum plated material, and extends or is bent substantially parallel to a plane defined by the interior surface 218 of the spacer frame member 210. In another embodiment, the second electrically conductive tab 232 is formed of a copper material, a copper clad material, or a copper plated material, and extends or is bent substantially at an acute angle with reference to the plane defined by the interior surface 218 of the spacer frame member 210. In the embodiment shown in FIG. 3B, a perimeter portion 234 of the battery cell 224 has a thickness less than the thickness t3 of the perimeter walls 220, while an interior portion 236 of the battery cell 224 has a thickness equal to or slightly greater than the thickness t3 of the perimeter walls 220 to facilitate compression of the battery cell 224 when assembled into a battery pack assembly. The perimeter portion 234 of the battery cell 224 cooperates with the cavity 216 and the perimeter walls 220 to form an isolated chamber or space to capture and vent to a predetermined vent area (not shown) any gases, liquids, or solids that the battery cell 224 might expel should the battery cell 224 experience a leak or a thermal runaway condition.

Ears 238 are formed in the spacer frame member 210 adjacent each corner 226 of the cavity 216. An aperture 240 is formed in each of the ears 238 to receive a tension rod (not shown) to interconnect the cooling frame member 210 with adjacent members to form a battery pack assembly and to hold the components of the battery pack assembly in compression. The cooling frame member 210 is also formed with a connection terminal 242 attached to a first end 244 of the spacer frame member 210. As shown in FIGS. 3A and 3B, the first end 244 corresponds to the outside of the fourth leg 266 of the spacer frame member 210. The connection terminal 242 is adapted to form a low resistance electrical connection with the first tab 230 of the battery cell 224. Favorable results have been obtained where the connection terminal 242 is a j-bar connection having a first leg 246 extending outwardly from the first end 244 substantially parallel to the plane defined by the interior surface 218 of the spacer frame member 210 and, if necessary, a second leg 248 in electrical communication with the first leg 246 extending at an angle of between about 45 degrees and 135 degrees from the first leg 246. The first tab 230 of the battery cell 224 and the first leg 246 of the connection terminal 242 are formed of similar material (i.e. aluminum or aluminum clad material) to facilitate a low electrical resistance connection therebetween, on the order of about 30 micro-Ohms. Favorable results have been obtained where the first tab 230 of the battery cell 224 and the first leg 246 of the connection terminal 242 are resistance welded, laser welded, soldered or brazed together to obtain the low electrical resistance connection therebetween. Once the first tab 230 of the battery cell 224 is electrically connected to the first leg 146 of the connection terminal 242, the spacer frame member 210 is ready to be combined with adjacent components, as discussed below with reference to FIG. 5.

A voltage sensing lead 250 extends from the first end 244 of the spacer frame member 210. The voltage sensing lead 250 is shown as a male pin style lead, but it is understood that the voltage sensing lead 250 may facilitate any type of electrical connection as desired. The voltage sensing lead 250 is in electrical communication with the connection terminal 242, and may be integrally formed therewith. Optionally, a current limiting device 252 such as a fuse or similar device may be electrically interposed between the connection terminal 242 and the voltage sensing lead 250 to protect voltage sensing equipment or circuitry (not shown) from current surges. If desired, a portion of the voltage sensing lead 250, including the current limiting device 252, may be embedded or over molded into the first end 244 of the spacer frame member 210 to provide protection thereto.

A second end 258 of the cooling frame member, corresponding to the outside of the third leg 264 in FIGS. 3A and 3B, includes a support plate 276 integrally formed in the third leg 264. The support plate 276 is electrically non-conductive, and is adapted to provide support to the second tab 232 of the battery cell 224 and to align the second tab 232 with a connection terminal on an adjacent member, as will be discussed below with reference to FIG. 5.

Figure 4A:
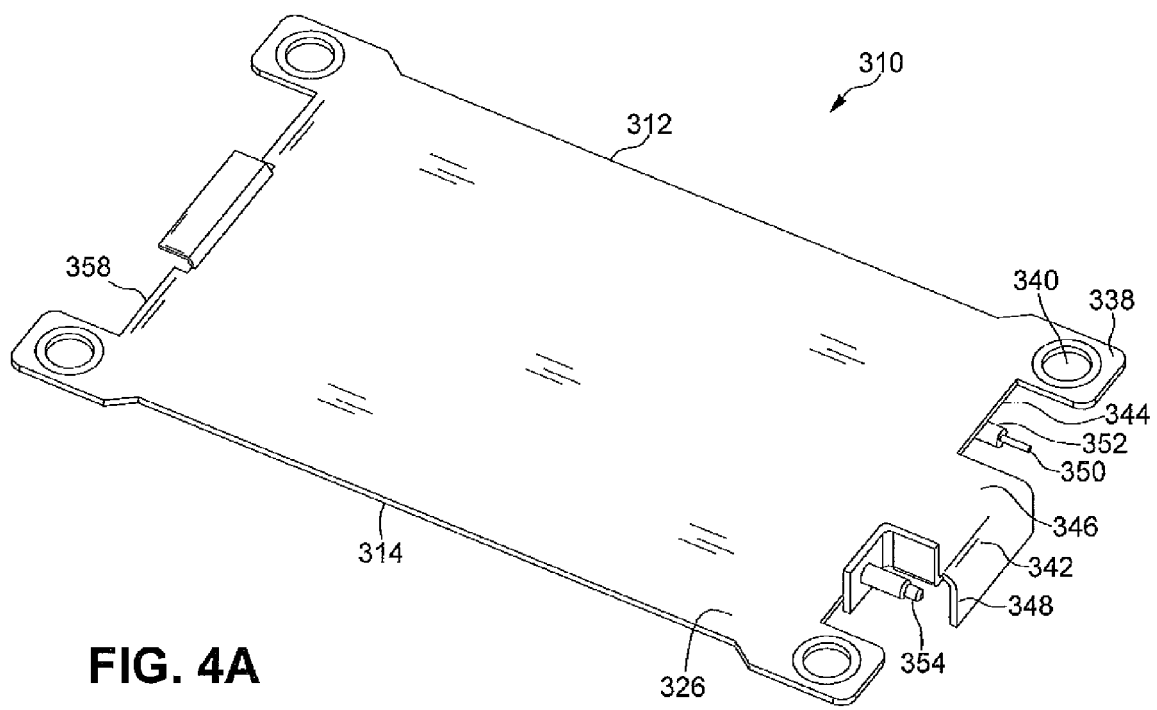
FIG. 4A is a perspective view of an end module member according to the present disclosure.
Figure 4B:
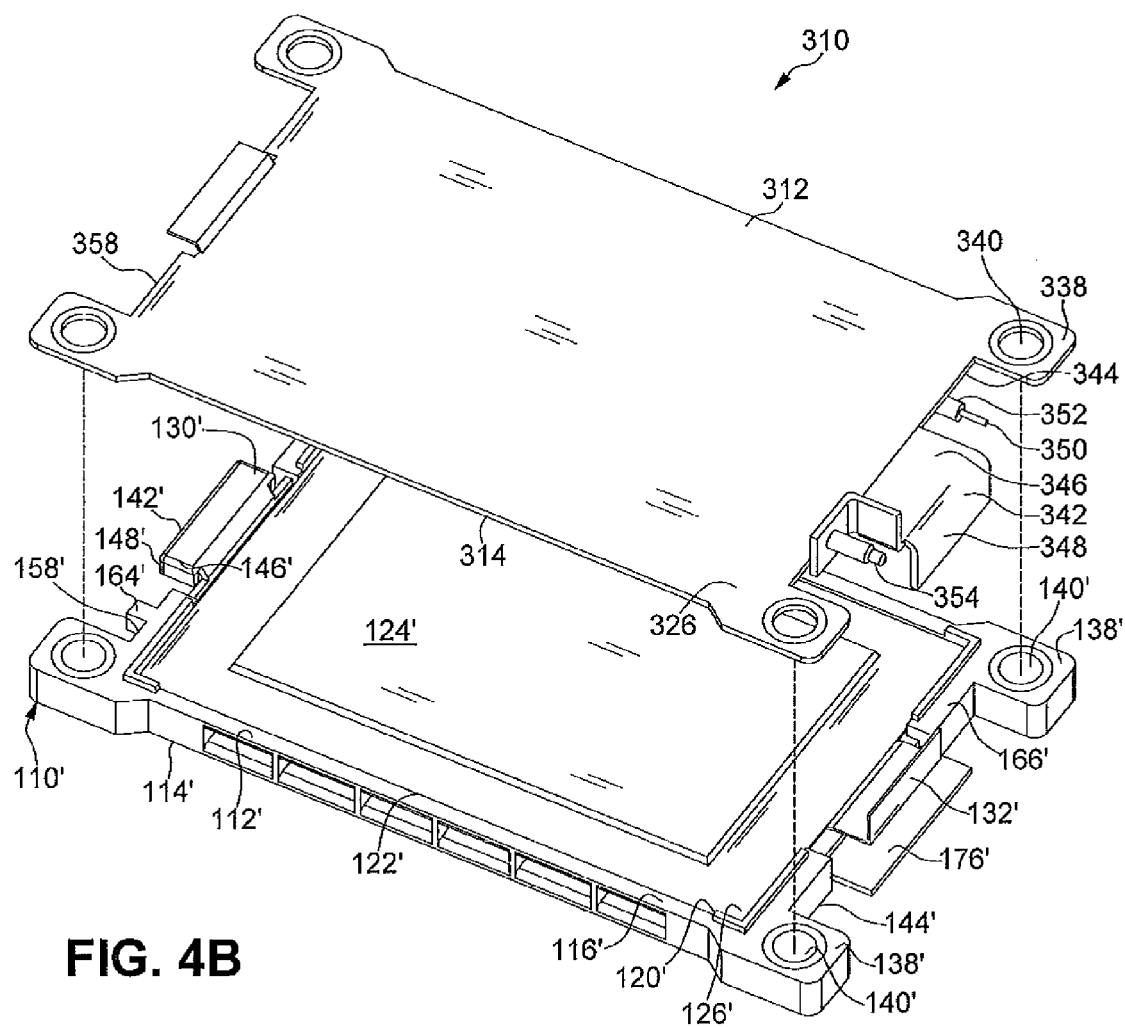
FIG. 4B is an exploded perspective view of an end module member, a second cooling frame member, and a fourth battery cell.

An end module member 310 and a second cooling frame member 110', including a battery cell 124', are shown in FIGS. 4A and 4B. While the end module member 310 is represented as having a substantially rectangular shape, it is understood that the end module member 310 may have any shape as desired to accommodate a shape of a battery cell and a fitment with an associated electrical device. It is further understood that the end module member 310 will have substantially the same shape as the end frame member 10 described with reference to FIGS. 1A and 1B, the cooling frame member 110 described with reference to FIGS. 2A and 2B, and the spacer frame member 210 described with reference to FIGS. 3A and 3B. The end module member 310 is formed as a unitary member by known methods from an electrically non-conductive material. As a non-limiting example, the end module member 310 may be formed by injection molding a material such as a nylon, polypropylene, metal, or other material having suitable physical and chemical properties.

The end module member 310 includes an exterior side 312 and an interior side 314. The exterior side 312 may include any desired surface features, or may be formed as a substantially planar inner surface. The interior side 314 is designed to cooperate with and engage a cavity 116' and corresponding surface features of a first side 112' of an adjacent cooling frame member 110'. The cooling frame member 110' is substantially similar to the cooling frame member 110 previously described. Structure repeated from the description of the cooling frame member 110 includes the same reference numeral and a prime (') symbol. A single battery cell 124' is received within the cavity 116' on the cooling frame member 110' and is compressed and engaged by the interior side 314 of the end module member 310. The perimeter walls 120' also provide separation between the end module member 310 and the cooling frame member 110'. The end module member 310 therefore provides a cover to the battery cell 124' and the cavity 116'.

The cooling frame member 110' includes a connection terminal 142' attached to a second end 158' of the cooling frame member 110'. As shown in FIG. 4B, the second end 158' corresponds to the outside of the third leg 164' of the cooling frame member 110'. The connection terminal 142' is adapted to form a low resistance electrical connection with the first tab 130' of the battery cell 124'. Favorable results have been obtained where the connection terminal 142' is a j-bar connection having a first leg 146' extending outwardly from the second end 158' substantially parallel to the plane defined by the interior surface 118' of the cooling frame member 110' and, if necessary, a second leg 148' in electrical communication with the first leg 146' extending at an angle of between about 45 degrees and 135 degrees from the first leg 146'. The first tab 130' of the battery cell 124' and the first leg 146' of the connection terminal 142' are formed of similar material (i.e. aluminum or aluminum clad material) to facilitate a low electrical resistance connection therebetween, on the order of about 30 micro-Ohms. Favorable results have been obtained where the first tab 130' of the battery cell 124' and the first leg 146' of the connection terminal 142' are resistance welded, laser welded, soldered or brazed together to obtain the low electrical resistance connection therebetween.

A first end 144' of the cooling frame member, corresponding to the outside of the fourth leg 166', includes a support plate 176' integrally formed in the fourth leg 166'. The support plate 176' is electrically non-conductive, and is adapted to provide support to the second tab 132' of the battery cell 124' and to align the second tab 132' with a connection terminal 342 on the end frame member 310. Once the first tab 130' of the battery cell 124' is electrically connected to the first leg 146' of the connection terminal 142', the cooling frame member 110' is ready to be combined with the end frame member 310.

Ears 338 are formed in the end module member 310 adjacent each corner 326 of the end module member 310. An aperture 340 is formed in each of the ears 338 to receive a tension rod (not shown) to interconnect the end module member 310 with adjacent members to form a battery pack assembly and to hold the components of the battery pack assembly in compression.

The connection terminal 342 on the end module member 310 is attached to a first end 344 of the end module member 310. The connection terminal 342 is adapted to form a low resistance electrical connection with the second tab 132' of the battery cell 124'. To make the electrical connection with the second tab 132' of the battery cell 124', the connection terminal 342 includes at least a leg 348 extending at an angle of between about 45 degrees and 135 degrees from a plane defined by the interior side 314 of the end module member 310. Favorable results have been obtained when the leg 348 is constructed of the same material as the second tab 132' of the battery cell 124'. As a non-limiting example, if the upwardly extending second tab 132' of the battery cell 124' is copper or copper clad, the leg 348 of the connection terminal 342 is also copper or copper clad to facilitate resistance welding, laser welding, soldering or brazing of the second tab 132' thereto.

The connection terminal 342 may be a j-bar connection, and includes a voltage sensing lead 350 extending from the first end 344 of the end module member 310. The voltage sensing lead 350 shown in FIGS. 4A and 4B is a male pin style lead, but it is understood that the voltage sensing lead 350 may facilitate any type of electrical connection as desired. The voltage sensing lead 350 is in electrical communication with the connection terminal 342, and may be integrally formed therewith. Optionally, a current limiting device 352 such as a fuse or similar device may be electrically interposed between the connection terminal 342 and the voltage sensing lead 350 to protect voltage sensing equipment or circuitry (not shown) from current surges. If desired, a portion of the voltage sensing lead 350, including the current limiting device 352, may be embedded or over molded into the first end 344 of the end module member 310 to provide protection thereto. The connection terminal 342 may also include an electrical connection 354 adapted to act as an external terminal for a battery pack assembly constructed according to the present disclosure for electrical interconnection with an electrical load or with an adjacent battery pack assembly.

Figure 5:
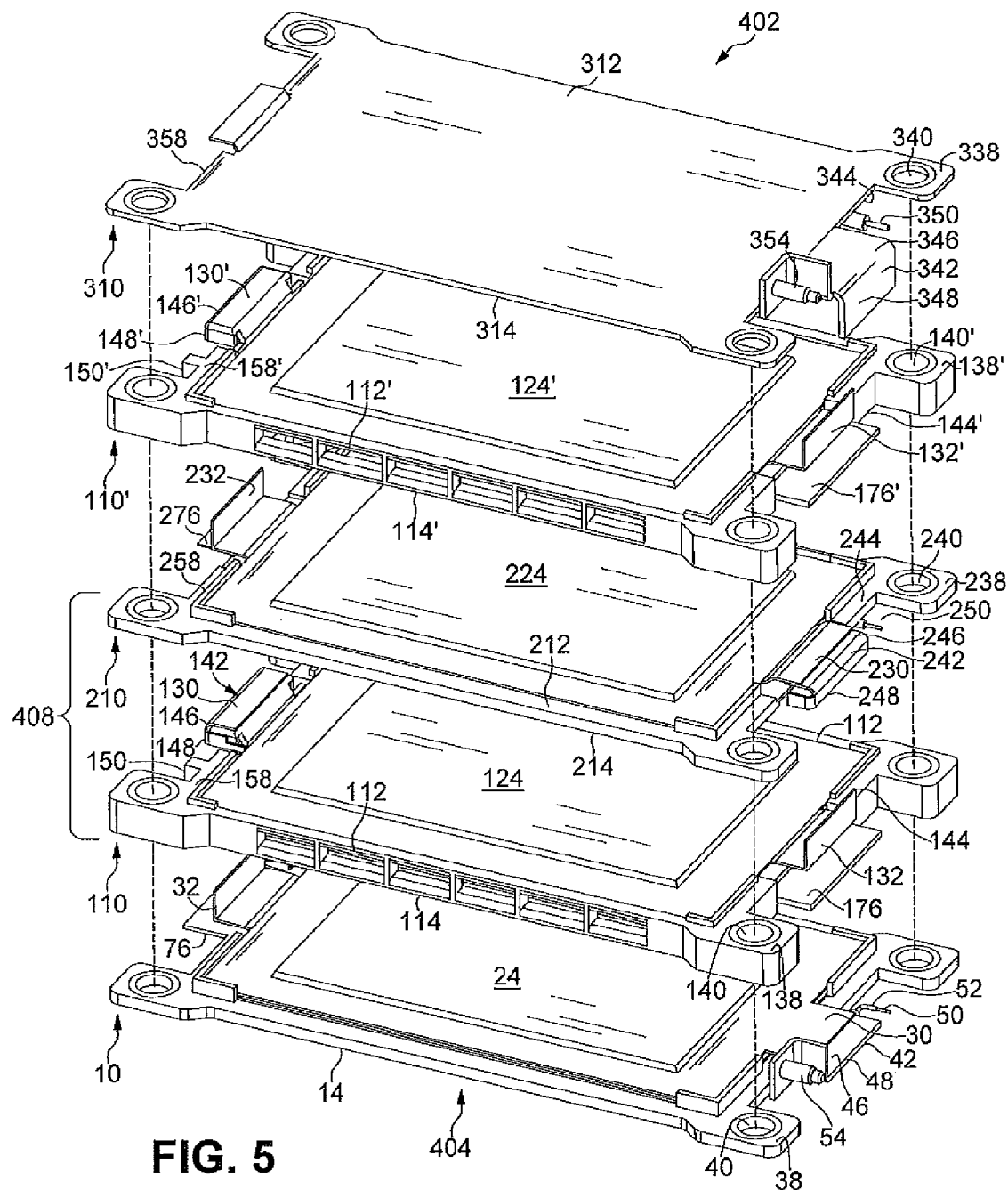
FIG. 5 is a partially exploded perspective view of a battery pack assembly according to the present disclosure including an end frame member and first battery cell, a first cooling frame member and a second battery cell, a spacer frame member and a third battery cell, a second cooling frame member and fourth battery cell, and an end module member.
Figure 6:
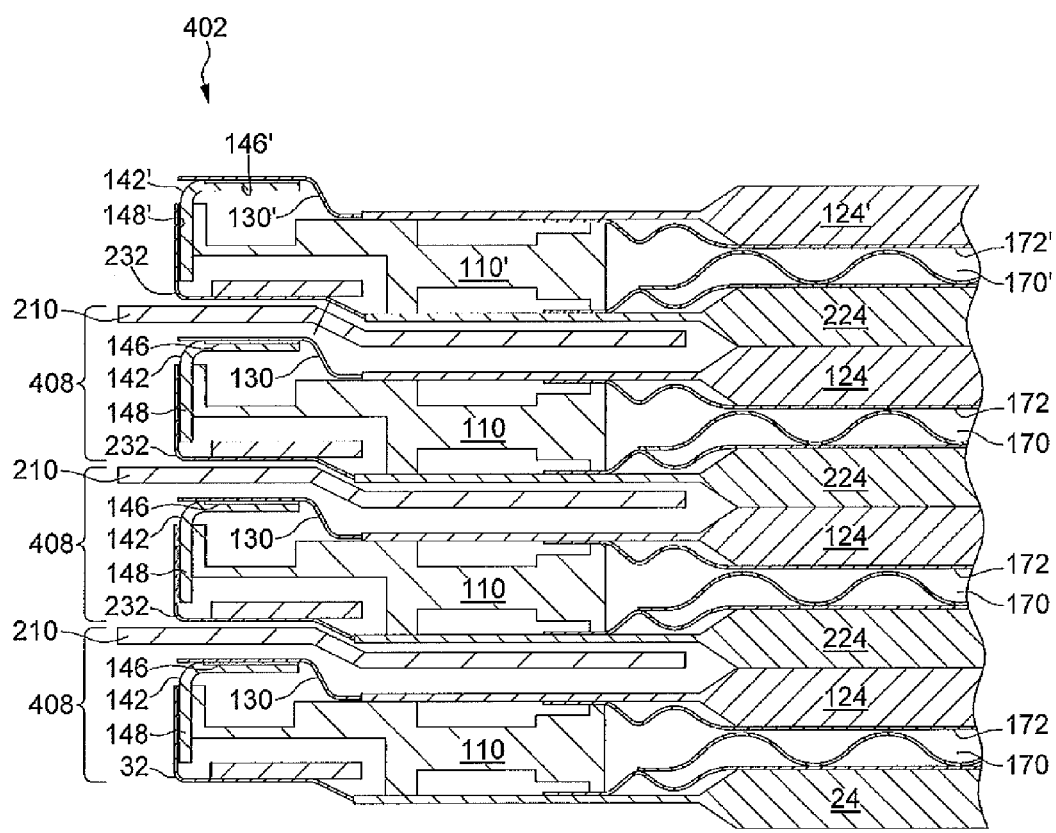
FIG. 6 is an enlarged fragmentary cross-sectional side elevational view of a portion of the battery pack assembly shown in FIG. 5 including a plurality of intermediate modules in an assembled form.

As shown in FIGS. 5 and 6, a battery pack assembly 402 may be constructed from an end frame member 10, a first cooling frame member 110, a spacer frame member 210, a second cooling frame member 110', an end module member 310, and battery cells 24, 124, 224, and 124'. A first end 404 of the battery pack assembly 402 is formed by the exterior side 14 of the end frame member 10. The battery cell 24 is placed adjacent the interior side 12 of the end frame member 10, and the first tab 30 of the battery cell 24 is connected to the first leg 46 of the connection terminal 42 by one of resistance welding, laser welding, soldering or brazing. The second tab 32 of the battery cell 24 extends at an angle away from the end frame member 10, and is supported by the electrically non-conductive support plate 76.

An intermediate module 408 is constructed by combining the cooling frame member 110 with the spacer frame member 210. The battery cell 124 is placed adjacent the first side 112. The first electrically conductive tab 130 of the battery cell 124 is connected with the first leg 146 of the connection terminal 142 adjacent the second end 158 of the cooling frame member 110 by one of resistance welding, laser welding, soldering or brazing. The second tab 132 of the battery cell 124 extends at an angle away from the cooling frame member 110, and is supported by the electrically non-conductive support plate 176 adjacent the first end 144 of the cooling frame member 110.

The spacer frame member 210 is stacked adjacent the cooling frame member 110 to close off the battery cell 124. The second surface 214 of the spacer frame member 210 may include surface features (not shown) that align with and receive a portion of the battery cell 124. When the spacer frame member is properly located, the second tab 132 of the battery cell 124 is arranged substantially parallel and in close proximity to the second leg 248 of the connection terminal 242 attached to the first end 244 of the spacer frame member 210. The battery cell 224 is adjacent the first surface 212 to allow the first electrically conductive tab 230 of the battery cell 224 to be electrically connected with the first leg 246 of the connection terminal 242 by one of resistance welding, laser welding, soldering or brazing. The second electrically conductive tab 232 of the battery cell 224 is supported by the electrically non-conductive support plate 276 adjacent the second end 258 of the spacer frame member 210.

The intermediate module 408 is stacked onto the end frame module 10 and the battery 24 wherein the second electrically conductive tab 32 of the battery cell 24 is arranged substantially parallel and in close proximity to the second leg 148 of the connection terminal 142 attached to the second end 158 of the cooling frame member 110. The second surface 114 of the cooling frame member 110 may include surface features (not shown) that align with and receive a portion of the battery cell 24.

A plurality of intermediate modules 408 may be constructed from cooling frame members 110, spacer frame members 210, and battery cells 124, 224 to form a battery pack assembly 402 having a desired voltage and power storage capability. For example, in a battery pack assembly 402 containing N battery cells, (N–2)/2 intermediate modules 408 may be utilized to create the desired battery pack assembly 402. The plurality of intermediate modules may be sequentially stacked so that the second electrically conductive tab 232 of the battery 224 associated with a spacer frame member 210 is located substantially parallel and in close proximity to the second leg 148 of the connection terminal 142 attached to the second end 158 of the adjacent cooling frame member. FIG. 6 shows a fragmentary cross-sectional view of three intermediate modules 408 sequentially stacked within the battery pack assembly 402, between an end frame member battery 24 and a second cooling frame member battery 124'.

When the desired number of intermediate modules 408 has been assembled, the battery pack assembly 402 may be completed by stacking a cooling frame member 110', a battery cell 124' and an end module member 310 onto the intermediate modules 408. When arranged properly, the battery cell 124' is placed adjacent the first side 112' and the first electrically conductive tab 130' of the battery cell 124' is connected with the first leg 146' of the connection terminal 142' adjacent the second end 158' of the cooling frame member 110' by one of resistance welding, laser welding, soldering or brazing. The second tab 132' of the battery cell 124' extends at an angle away from the cooling frame member 110', and is supported by the electrically non-conductive support plate 176' adjacent the first end 144' of the cooling frame member 110'. The end module member 310 is then placed on top of the battery cell 124'. The second surface 314 of the end module member 310 may include surface features (not shown) that align with and receive a portion of the battery cell 124'. The second tab 132' of the battery cell 124' is arranged substantially parallel and in close proximity to the second leg 348 of the connection terminal 342 attached to the first end 344 of the end module member 310.

To complete the battery pack assembly 402, tension rods (not shown) are inserted through the aligned apertures 40, 140, 240, 140' and 340 to hold the battery pack assembly 402 under compression. It is understood that the battery pack assembly 402 may be held under compression employing tension straps disposed around the battery pack assembly 402. It is further understood that seals may be provided about the perimeter of each end frame member 10, cooling frame member 110 or 110', spacer frame member 210, and end module member 310 to provide fluid tight seals therebetween as desired. The second electrically conductive tabs 32, 132, 232 and 132' are electrically connected by one of resistance welding, laser welding, soldering or brazing to the respective second legs 148, 248, 148 or 148' (if multiple intermediate modules 408 employed) and 348. Once the second electrically conductive tabs are connected, an electrical circuit may be completed by electrically connecting the electrical terminal 54 and the electrical terminal 354 to allow power from the battery cells 24, 124, 224 and 124' to drive an electrical load.

The battery pack assembly 402 of the present disclosure therefore provides an easy to manufacture assembly that supports each individual battery. The cooling frame members 110, 110' also provide sufficient cooling to each individual battery. The voltage sensing leads 50, 150, 250, 150' and 350 may be selectively monitored by electrical hardware to measure and adjust (via cell balancing) the voltage of each cell. By including current limiting devices 52, 152, 252, 152' and 352 between the respective connection terminals 42, 142, 242, 142' and 342 and the voltage sensing leads 50, 150, 250, 150' and 350, downstream voltage monitoring electronics are protected from current surges, and a separate interconnect board for consolidating voltage measurements is eliminated. The cavities 16, 116, 216 and 116' provide a space to capture and vent to a predetermined vent area any gases, liquids, or solids that a battery cell might expel should the battery cell experience a thermal runaway Further, because the first electrically conductive tabs 30, 130, 230 and 130' of the respective batteries 24, 124, 224 and 124' are resistance welded, laser welded, soldered or brazed in place before stacking, one-half of the battery electrical connections may be checked for defects before assembling the battery pack assembly 402, thereby minimizing the risk that the entire assembly 402 will be scrapped.

While certain representative embodiments and details have been shown for purposes of illustrating the invention, it will be apparent to those skilled in the art that various changes may be made without departing from the scope of the disclosure, which is further described in the following appended claims.

What is claimed is:
1. A battery pack assembly comprising:
an end frame member having an inner surface for receiving a first battery cell, a first end of the end frame member including a connection terminal for electrically connecting to a first electrically conductive tab of the first battery cell;
a first cooling frame member having a first side and a second side, the second side of the cooling frame member arranged adjacent the first battery cell, a second battery cell disposed adjacent the first side of the first cooling frame, a second end of the first cooling frame member including a connection terminal for electrically connecting a second electrically conductive tab of the first battery cell and a first electrically conductive tab of the second battery cell;

a spacer frame member having a first surface and a second surface, the second surface of the spacer frame member disposed adjacent the second battery cell, a third battery cell arranged adjacent the first surface of the spacer frame member, a first end of the spacer frame member including a connection terminal for electrically connecting a second electrically conductive tab of the second battery cell and a first electrically conductive tab of the third battery cell;

a second cooling frame member having a first side and a second side, the second side of the second cooling frame member disposed adjacent the third battery cell, a fourth battery cell disposed adjacent the first side of the second cooling frame member, a second end of the second cooling frame member including a connection terminal for electrically connecting a second electrically conductive tab of the third battery cell and a first electrically conductive tab of the fourth battery cell; and an end module member having a first surface and a second surface, the first surface of the end module member disposed adjacent the fourth battery cell, a first end of the end module member including a connection terminal for electrically connecting a second electrically conductive tab of the fourth battery cell.

2. The battery pack assembly of claim 1, wherein at least one of the connection terminal of the end frame member, the connection terminal of the first cooling frame member, the connection terminal of the spacer frame member, the connection terminal of the second cooling frame member, and the connection terminal of the end module member includes a voltage sensing lead in electrical communication therewith.

3. The battery pack assembly of claim 2, wherein a current limiting device is interposed between the voltage sensing lead and at least one of the connection terminal of the end frame member, the connection terminal of the first cooling frame member, the connection terminal of the spacer frame member, the connection terminal of the second cooling frame member, and the connection terminal of the end module member.

4. The battery pack assembly of claim 1, wherein the first electrically conductive tab of the first battery is attached to the connection terminal of the end frame member, the second electrically conductive tab of the first battery and the first electrically conductive tab of the second battery are attached to the connection terminal of the first cooling frame member, the second electrically conductive tab of the second battery and the first electrically conductive tab of the third battery are attached to the connection terminal of the spacer frame member, the second electrically conductive tab of the third battery and the first electrically conductive tab of the fourth battery are attached to the connection terminal of the second cooling frame member, and the second electrically conductive tab of the fourth battery is attached to the connection terminal of the end member with one of resistance welding, laser welding, soldering and brazing.

5. The battery pack assembly of claim 1, wherein the first electrically conductive tab of the one of the first, second, third, and fourth battery cells extends outwardly from a perimeter of the one of the first, second, third and fourth battery cells substantially parallel to a plane defined by the first surface of the end frame member, and the second electrically conductive tab of the one of the first, second, third and fourth battery cells extends outwardly from the perimeter of the one of the first, second, third and fourth battery cells at an angle of between 45 degrees and 135 degrees in respect of the plane defined by the first surface of the end frame member.

6. The battery pack assembly of claim 1, wherein at least one of the inner surface of the end frame member, the first side of the first cooling frame member, the first surface of the spacer frame member, and the first side of the second cooling frame member includes a cavity formed thereon to receive one of the first battery cell, the second battery cell, the third battery cell and the fourth battery cell respectively, at least one perimeter wall formed along at least a portion of a perimeter of the cavity, at least one perimeter wall having a height substantially equal to a thickness of the one of the first battery cell, the second battery cell, the third battery cell and the fourth battery cell.

7. The battery pack assembly of claim 1, wherein the spacer frame member includes a first leg, a second leg, a third leg, and a fourth leg forming an opening therebetween to facilitate thermal communication between the second battery cell and the third battery cell.

8. A battery pack assembly comprising:

an end frame member having an inner surface for receiving a first battery cell, a first end of the end frame member including a connection terminal for electrically connecting to a first electrically conductive tab of the first battery cell;

a plurality of intermediate modules, each module comprising:

a first cooling frame member having a first side and a second side, the second side of the cooling frame member arranged adjacent the first battery cell, a second battery cell disposed adjacent the first side of the first cooling frame, a second end of the first cooling frame member including a connection terminal for electrically connecting a second electrically conductive tab of the first battery cell and a first electrically conductive tab of the second battery cell; and a spacer frame member having a first surface and a second surface, the second surface of the spacer frame member disposed adjacent the second battery cell, a third battery cell arranged adjacent the first surface of the spacer frame member, a first end of the spacer frame member including a connection terminal for electrically connecting a second electrically conductive tab of the second battery cell and a first electrically conductive tab of the third battery cell;

a second cooling frame member having a first side and a second side, the second side of the second cooling frame member disposed adjacent the third battery cell, a fourth battery cell disposed adjacent the first side of the second cooling frame member, a second end of the second cooling frame member including a connection terminal for electrically connecting a second electrically conductive tab of the third battery cell and a first electrically conductive tab of the fourth battery cell; and an end module member having a first surface and a second surface, the first surface of the end module member disposed adjacent the fourth battery cell, a first end of the end module member including a connection terminal for electrically connecting a second electrically conductive tab of the fourth battery cell.

9. The battery pack assembly of claim 8, wherein the connection terminal of the end frame member, the connection terminal of the first cooling frame member, the connection terminal of the spacer frame member, the connection terminal of the second cooling frame member, and the connection terminal of the end module member includes a voltage sensing lead in electrical communication therewith, and a current limiting device interposed between each of the voltage sensing leads and the connection terminal of the first cooling frame member, the connection terminal of the second cooling frame member, and the connection terminal of the end module member.

10. The battery pack assembly of claim 8, wherein the first battery cell, the second battery cell, the third battery cell and the fourth battery cell are substantially similar, the first electrically conductive tabs of the first battery cell, the second battery cell, the third battery cell, and fourth battery cell extending outwardly from a perimeter of the first battery cell, the second battery cell, the third battery cell and the fourth battery cell substantially parallel to a plane defined in respect of the end frame member first surface, and the second electrically conductive tab of the first battery cell, the second battery cell, the third battery cell and the fourth battery cell extending outwardly from the perimeter of the first battery cell, the second battery cell, the third battery cell and the fourth battery cell at an angle of between 45 degrees and 135 degrees in respect of the plane defined by the first surface of the end frame member.

11. The battery pack assembly of claim 8, wherein the spacer frame member includes a first leg, a second leg, a third leg, and a fourth leg forming an opening therebetween to facilitate thermal communication between the second battery cell and the third battery cell.

\* \* \* \* \*